3,354,122
POLYMERS OF POLYACYLHYDRAZONES AND
PROCESS OF PREPARATION THEREFOR
Rudolph Henry Michel, Tonawanda, N.Y., assignor to
E. I. du Pont de Nemours and Company, Wilmington,
Del., a corporation of Delaware
No Drawing. Filed Dec. 21, 1962, Ser. No. 246,346
7 Claims. (Cl. 260—63)

ABSTRACT OF THE DISCLOSURE

A process for preparing tractable polyacylhydrazones characterized by an inherent viscosity of at least 0.4 is provided wherein equimolar amounts of a dicarboxylic acid dihydrazide are reacted with a dialdehyde in a solvent including dimethylsulfoxide.

---

This invention relates to polyacylhydrazones and processes for their preparation. More particularly, this invention relates to tractable polyacylhydrazones of high molecular weight and processes for their preparation.

Prior attempts to prepare polyacylhydrazones have only resulted in the isolation of low molecular weight polymers. These polymers are not suitable for casting into tough films as are the high molecular weight polymers of the present invention having an inherent viscosity of at least 0.4 as a 0.25% by weight solution at 30° C.

It is an object of this invention to provide polyacylhydrazones and a process for their preparation.

A further object of this invention is to provide tractable polyacylhydrazones of high molecular weight and a process for their preparation.

A still further object of this invention is to provide tractable polyacylhydrazones of high molecular weight which can be cast into tough films which have a good combination of electrical, thermal and hydrolytic properties. These and other objects will appear hereinafter.

These and other objects of this invention are accomplished by the polyacylhydrazones of this invention having a recurring structural unit of the formula:

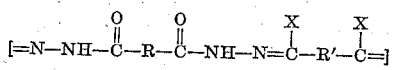

where R and R' are hydrocarbon radicals of from 0 through 18 carbon atoms and X is selected from the group consisting of hydrogen and alkyl. The polyacylhydrazones of the invention have an inherent viscosity of at least about 0.4 as a 0.25% by weight solution at 30° C. in a solvent selected from the group consisting of hexamethylphosphoramide and dimethylsulfoxide.

Preferred polyacylhydrazones of this invention have a recurring structural unit of the formula:

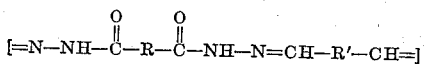

where R and R' have the same meaning as defined above.

The products are colorless to yellow solids melting as high as 300° C. or higher. They have inherent viscosities of at least 0.4 and generally ranging from about 0.4 to 1.5, as determined in hexamethylphosphoramide or dimethyl sulfoxide (0.25% solution by weight at 30° C.).

The inherent viscosity of the polymers can be determined with a viscometer in the usual way on solutions made as follows: The polymer is dissolved at 0.25% by weight in hexamethylphosphoramide or dimethyl sulfoxide, using vigorous stirring and heat. In some instances, temperatures of up to 150° C. for 30 minutes are required. The solution is then cooled to 30° C.

The polyacylhydrazones of the present invention are prepared by reacting approximately equimolar amounts of at least one organic dicarboxylic acid dihydrazide and at least one compound of the formula

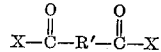

where R' is a divalent hydrocarbon radical of from 0 through 18 carbon atoms and X is selected from the group consisting of hydrogen and alkyl in a solvent selected from the group consisting of hexamethylphosphoramide, N-methylpyrrolidone, dimethyl sulfoxide, trifluoroacetic acid, N,N'-dimethylacetamide, hexafluoroacetone hydrate and sym-dichlorotetrafluoroacetone hydrate.

A typical procedure involves simply dissolving the hydrazide or mixture of hydrazides in the solvent at room temperature, followed by the addition of the dialdehyde or mixture of dialdehydes. The reaction is not rapid, continuing for many hours and several days in some cases. After a polymer of suitable molecular weight has formed, it is precipitated by pouring the solution into a non-solvent for the polymer such as methanol, ethanol, isopropanol, water, and hydrocarbon solvents. Washing with the non-solvent and drying produces a polymer suitable for making film. This exact procedure is not critical. For example, it is possible to add the reactants in the reverse order, or both at once. The reaction can be run at higher or lower temperatures and the non-solvent can be added to the solution after polymerization has occurred.

The reaction can be illustrated as follows:

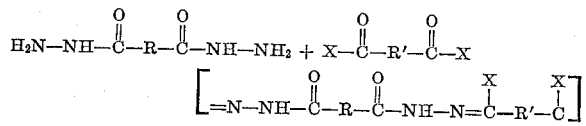

where R and R' are the same, different or a mixture of divalent hydrocarbon radicals of from 0 through 18 carbon atoms and X is hydrogen or alkyl. Of course, where R and R' have 0 carbon atoms, this means that either oxalic acid dihydrazide or glyoxal or both were the reactants and the carbonyl carbons would be adjacent to each other.

The organic dicarboxylic acid dihydrazides operable in the present invention include unsubstituted aromatic dicarboxylic acid dihydrazides of acids such as isophthalic acid, terephthalic acid, 4,4'-diphenyldicarboxylic acid, 3,3'-diphenyldicarboxylic acid, 2,6-naphthalene dicarboxylic acid, etc. or substituted compounds such as the corresponding nitro or alkoxy derivatives. Also included are unsubstituted aliphatic dihydrazides, particularly dihydrazides of dicarboxylic acids such as malonic acid, succinic acid, glutaric acid, adipic acid, sebacic acid, etc. and their unsaturated dicarboxylic acid counterparts such as maleic acid, glutaconic acid, etc. Oxalic acid is also included in this group.

The dihydrazides are conveniently made by reacting the corresponding dimethyl ester or diacid chloride of the dicarboxylic acid with hydrazine, $H_2N-NH_2$.

Representative dialdehydes useful in the present invention for reaction with the dihydrazides are unsubstituted aromatic dialdehydes such as terephthalaldehyde, isophthalaldehyde, etc. 4,4'-diformyl-biphenyl, 2,6-diformyl-naphthalene; aliphatic dialdehydes, i.e., alkyl dialdehydes such as glutaraldehyde, succinaldehyde, adipaldehyde, sebacaldehyde, etc. and glyoxal. Any of the dialdehydes can be mixed with themselves or with up to about 25% of diketones.

Although diketones also react in the same manner, the polymers made from diketones alone (as opposed to mixtures with dialdehydes) have molecular weights below the lower limits of this invention. Among the operable diketones for mixing with dialdehydes are alkyl diketones such as 2,5-hexanedione (acetonylacetone), 2,9-decanedione and biacetyl. An operable aromatic diketone would be p-diacetylbenzene.

In general, the highest molecular weight polymers made from the above process are obtained from aromatic dialdehydes, medium molecular weight polymers from aliphatic dialdehydes and lowest weight molecular weight polymers from diketones.

The relatively high melting points of these polymers preclude melt casting into films. For solvent-casting to transparent, tough films it is necessary, of course, to have complete solubility of the polymer. To permit the use of a given solvent because of economic reasons, it is sometimes preferable to make a copolymer, i.e., a polymer prepared from a mixture of dihydrazides or a mixture of dialdehydes (including small amounts of diketones).

The invention can be further understood by referring to the following examples.

Example I

A 250 ml. three-necked flask equipped with a stirrer and two glass stoppers is charged with 100 ml. of dimethyl sulfoxide, 0.24 mole adipic acid dihydrazide and 0.24 mole isophthalic acid dihydrazide. After all the dihydrazide is dissolved, 0.48 mole terephthalaldehyde is added and the solution stirred at room temperature for 48 hours. A portion of the polymer solution is stirred into methanol. The precipitated polymer is repeatedly washed with methanol in a blender and then dried under vacuum. The inherent viscosity of this polymer is 1.35, as a 0.25% by weight solution in dimethyl sulfoxide at 30° C.

Another portion of the reaction solution is cast into a transparent film of about 1 mil in thickness. This film is dried 72 hours at 75° C. and 24 hours at 100° C. under vacuum. The tensile strength and modulus are 13,100 and 497,000 p.s.i., respectively. Elongation is 22% and pneumatic impact strength 1.7 kg.-cm. Thus, this film is suitable for many film uses.

As control experiments, dimethylformamide and ethanol are substituted for dimethyl sulfoxide. The inherent viscosities of the products (in hexamethylphosphoramide) are 0.32 and 0.26, respectively.

Example II

Example I is repeated twice, using hexamethylphosphoramide as the polymerization medium and a reaction time of 144 hours in both cases. The molar ratios of isophthalic acid dihydrazide to adipic acid dihydrazide are 9:1 (A) and 3:1 (B), respectively (instead of 1:1 as in Example I), and the inherent viscosities of the products are 1.51 and 0.76, respectively, under the conditions described above. Both products are light yellow.

The reaction mixtures are cast into films and dried at 100° C. under vacuum, producing films having the following properties:

| Sample | Tensile (p.s.i.) | Modulus (p.s.i.) | Elongation (Percent) | Thickness (mils) |
|---|---|---|---|---|
| A | 3,400 | 211,000 | 7 | 1.6 |
| B | 4,300 | 210,000 | 11 | 2.6 |

Examples III–V

The dihydrazides of isophthalic acid (III), adipic acid (IV) and sebacic acid (V) are each reacted with an equimolar amount of terephthalaldehyde for 70 hours in hexamethylphosphoramide. The products are examined and worked up by the procedure of Example I.

| Example | Inherent Viscosity | Fusion Temp.* | Color |
|---|---|---|---|
| III | 1.10 | 368 | Bright yellow. |
| IV | 0.54 | 300 | Light yellow. |
| V | 0.50 | 300 | Colorless. |

*Temperature at which polymer becomes fluid on a melting point block; corresponds to melting points mentioned above.

In each case the reaction solution is suitable for casting into film of the corresponding polyacylhydrazone.

Examples VI–VII

Glutaraldehyde is reacted for 192 hours at room temperature in hexamethylphosphoramide with equimolar amounts of (A) isophthalic acid dihydrazide and (B) a 1:1 molar mixture of isophthalic and adipic acid dihydrazides. Both polyacylhydrazones are colorless. Their inherent viscosities and fusion temperatures are 0.45 and about 0.40, respectively, and 262° C. and 175° C., respectively.

The polymers of this invention are useful for making film having fairly high thermal stability. The hydrolytic stability of the amorphous, i.e., copolymeric-polyhydrazones is surprisingly good for a completely amorphous condensation polymer.

The films made from the polymers of this invention are fairly tough and have good electrical properties, i.e., dielectric constant, dissipation factor and resistance.

These polymers react with divalent copper ions to give a brown derivative which is insoluble in dimethyl sulfoxide. These can be made in film form by exposing the polyacylhydrazone film to a solution of cuprous acetate.

What is claimed is:

1. A process for preparing tractable polyacylhydrazones comprising: reacting approximately equimolar amounts of at least one organic dicarboxylic acid dihydrazide and at least one compound of the formula:

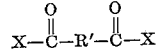

where R' is a hydrocarbon radical of from 0 through 18 carbon atoms and X is selected from the group consisting of hydrogen and alkyl in a solvent selected from the group consisting of hexamethylphosphoramide, N-methylpyrrolidone, dimethylsulfoxide, trifluoroacetic acid, N,N'-dimethylacetamide, hexafluoroacetone hydrate and sym-dichlorotetrafluoroacetone hydrate, whereby said polyacylhydrazone is characterized by an inherent viscosity of at least 0.4 when measured at 30° C. in a 0.25% by weight solution thereof in hexamethylphosphoramide or dimethylsulfoxide.

2. The process of claim 3 wherein glutaraldehyde is reacted with an equimolar amount of isophthalic acid dihydrazide in hexamethylphosphoramide.

3. The process of claim 3 wherein a 1:1 molar mixture of isophthalic and adipic acid dihydrazides is reacted with isophthalic acid dihydrazide.

4. The process of claim 3 wherein terephthaladehyde is reacted with an equimolar amount of a 1:1 molar mixture of isophthalic and adipic acid dihydrazides in dimethylsulfoxide.

5. The process of claim 3 wherein terephthalaldehyde is reacted with an equimolar amount of isophthalic acid dihydrazide in hexamethylphosphoramide.

6. A process for preparing tractable polyacylhydrazones comprising: reacting approximately equimolar amounts of at least one unsubstituted alkyl dicarboxylic acid dihydrazide and at least one unsubstituted aromatic dialdehyde in a solvent selected from the group consisting of hexamethylphosphoramide, N-methylpyrrolidone, dimethylsulfoxide, trifluoroacetic acid, N,N'-dimethylacetamide, hexafluoroacetone hydrate and sym-dichlorotetrafluoroacetone hydrate, whereby said polyacylhydrazone is characterized by an inherent viscosity of at least 0.4 when measured at 30° C. in a 0.25% by weight solution thereof in hexamethylphosphoramide or dimethylsulfoxide.

7. A process for preparing tractable polyacylhydrazones comprising: reacting approximately equimolar amounts of at least one unsubstituted aromatic dicarboxylic acid dihydrazide and at least one unsubstituted aromatic dialdehyde in a solvent selected from the group consisting of hexamethylphosphoramide, N-methylpyrrolidone, dimethyl sulfoxide, trifluoroacetic acid, N,N'-dimethylacetamide, hexafluoroacetone hydrate and sym-dichlorotetrafluoroacetone hydrate, whereby said polyacylhydrazone is characterized by an inherent viscosity of at least 0.4 when measured at 30° C. in a 0.25% by weight solution thereof in hexamethylphosphoramide or dimethylsulfoxide.

References Cited
UNITED STATES PATENTS

| 2,555,646 | 6/1951 | Jones | 260—65 |
| 3,025,265 | 3/1962 | Maeder | 260—63 |
| 3,124,559 | 3/1964 | De Witt | 260—72 |

WILLIAM H. SHORT, *Primary Examiner.*

L. M. MILLER, L. M. PHYNES, *Assistant Examiners.*

UNITED STATES PATENT OFFICE
CERTIFICATE OF CORRECTION

Patent No. 3,354,122            November 21, 1967

Rudolph Henry Michel

It is hereby certified that error appears in the above numbered patent requiring correction and that the said Letters Patent should read as corrected below.

Column 2, line 37, for "thruogh" read -- through --; column 4, lines 53, 56, 59 and 63, for the claim reference numeral "3", each occurrence, read -- 1 --; same column 4, line 59, for "terephthaladehyde" read -- terephthalaldehyde --.

Signed and sealed this 3rd day of December 1968.

(SEAL)
Attest:

Edward M. Fletcher, Jr.            EDWARD J. BRENNER
Attesting Officer            Commissioner of Patents